United States Patent
Bozzolo et al.

(10) Patent No.: US 10,622,650 B2
(45) Date of Patent: Apr. 14, 2020

(54) SYSTEM AND METHOD FOR FUEL CELL STACK TEMPERATURE CONTROL

(71) Applicant: LG Fuel Cell Systems Inc., North Canton, OH (US)

(72) Inventors: Michele Bozzolo, Derby (GB); Francesco Caratozzolo, Derby (GB); David Silveira Erel, Derby (GB); Alberto Traverso, Novi Ligure (IT)

(73) Assignee: LG FUEL CELL SYSTEMS INC., North Canton, OH (US)

( * ) Notice: Subject to any disclaimer, the term of this patent is extended or adjusted under 35 U.S.C. 154(b) by 28 days.

(21) Appl. No.: 15/811,290

(22) Filed: Nov. 13, 2017

(65) Prior Publication Data

US 2019/0148749 A1 May 16, 2019

(51) Int. Cl.
*H01M 8/0432* (2016.01)
*H01M 8/04014* (2016.01)
*H01M 8/2425* (2016.01)
*H01M 8/04746* (2016.01)
*H01M 8/04701* (2016.01)
*H01M 8/04858* (2016.01)
*H01M 8/124* (2016.01)

(52) U.S. Cl.
CPC ..... *H01M 8/04365* (2013.01); *H01M 8/04014* (2013.01); *H01M 8/0491* (2013.01); *H01M 8/04335* (2013.01); *H01M 8/04701* (2013.01); *H01M 8/04753* (2013.01); *H01M 8/2425* (2013.01); *H01M 8/04738* (2013.01); *H01M 2008/1293* (2013.01)

(58) Field of Classification Search
None
See application file for complete search history.

(56) References Cited

U.S. PATENT DOCUMENTS

| 6,602,624 B1 | 8/2003 | Doan et al. |
| 2006/0063048 A1 | 3/2006 | Kolodziej |
| 2010/0239925 A1 | 9/2010 | Ohkawara et al. |
| 2010/0310951 A1 | 12/2010 | Hatada |
| 2013/0101873 A1* | 4/2013 | Dionne ................ F01K 27/02 429/9 |

* cited by examiner

*Primary Examiner* — Daniel S Gatewood
(74) *Attorney, Agent, or Firm* — Dentons US LLP

(57) ABSTRACT

Various embodiments of the present disclosure provide a fuel cell system configured to modulate the flow of oxidant through the fuel cell system to maintain a desired temperature at the fuel cell stack. The fuel cell system is configured to control the flow of oxidant to maintain the desired temperature in the fuel cell stack based on temperature measurements of fluid outside of the fuel cell stack.

7 Claims, 6 Drawing Sheets

SYSTEM AND METHOD FOR FUEL CELL STACK TEMPERATURE CONTROL

CROSS-REFERENCE TO RELATED APPLICATIONS

This application is related to concurrently filed and co-pending applications identified as: U.S. patent application Ser. No. 15/811,281, filed Nov. 13, 2017, entitled "System and Method for Fuel Cell Stack Temperature Control", with named inventors Michele Bozzolo, Francesco Caratozzolo, David Silveira Erel and Alberto Traverso; and U.S. patent application Ser. No. 15/811,294, filed Nov. 13, 2017, entitled "System and Method for Fuel Cell Stack Temperature Control", with named inventors Michele Bozzolo, Francesco Caratozzolo, David Silveira Erel and Alberto Traverso.

FIELD

The present disclosure relates to fuel cell systems. More specifically, the present disclosure relates to a system and method for controlling the temperature of the fuel cell stack.

BACKGROUND

A fuel cell is an electrochemical conversion device that produces electricity by oxidizing a fuel. A fuel cell typically includes an anode, a cathode, and an electrolyte between the anode and the cathode. A fuel cell system usually includes multiple fuel cells electrically connected to one another in series via interconnects (sometimes collectively referred to as a "fuel cell unit") and several components configured to provide the fuel to the anodes of the fuel cells and an oxidant to the cathodes of the fuel cells. The oxygen in the oxidant is reduced at the cathode into oxygen ions that diffuse through the electrolytes into the anodes. The fuel is oxidized at the anodes, which produces electrons that flow through an electrical load.

Solid oxide fuel cell (SOFC) systems (and other high-temperature fuel cell systems) require a relatively high operating temperature, such as 1000 degrees Celsius, to maintain low internal electrical resistance and achieve optimal performance. Accordingly, there is a need for systems and methods for controlling high-temperature fuel cell systems to maintain a desired temperature in the fuel cell stack.

SUMMARY

Various embodiments of the present disclosure provide a fuel cell system configured to modulate the flow of oxidant through the fuel cell system to maintain a desired temperature at the fuel cell stack. The fuel cell system is configured to control the flow of oxidant to maintain the desired temperature in the fuel cell stack based on temperature measurements of fluid outside of the fuel cell stack.

A method is presented of operating a fuel cell system comprising a fuel cell stack comprising multiple fuel cells each comprising an anode and a cathode. The method comprises providing, by an oxidant flow control device and at an oxidant mass flow rate, an oxidant to the cathodes; providing, by a fuel flow control device and at a fuel mass flow rate, a fuel to the anodes; controlling, by a controller and based on a current set point, the fuel cell stack to provide an electrical current to an electrical load; sensing, by a temperature sensor, a temperature of the oxidant upstream of the fuel cell stack and sending, by the temperature sensor, a signal representing the sensed temperature to the controller; controlling, by the controller and based on the sensed temperature, the oxidant mass flow rate; controlling, by the controller and based on the current set point, an oxidant heater to heat the oxidant upstream of the fuel cell stack; and determining, by the controller and based on the current set point, the fuel mass flow rate.

In some embodiments the method further comprises providing, by an auxiliary fuel flow control device and at an auxiliary fuel mass flow rate, an auxiliary fuel to an oxidant heater. In some embodiments the method further comprises controlling, by the controller, the oxidant heater to heat the oxidant upstream of the fuel cell stack using the received auxiliary fuel. In some embodiments controlling the oxidant heater to heat the oxidant point includes determining, by the controller and based on the current set point, the auxiliary fuel mass flow rate. In some embodiments a first current set point corresponds to a first fuel mass flow rate and a first auxiliary fuel mass flow rate and a second current set point that is greater than the first current set point corresponds to a second fuel mass flow rate that is greater than the first fuel mass flow rate and a second auxiliary fuel mass flow rate that is less than the first auxiliary fuel mass flow rate.

In some embodiments the method further comprises controlling, by the controller, the oxidant flow control device to provide the oxidant to the cathodes and controlling, by the controller, the fuel flow control device to provide the fuel to the anodes.

In some embodiments the method further comprises determining, by the controller, a difference between the sensed temperature and a temperature set point. In some embodiments the method further comprises controlling, by the controller, the oxidant mass flow rate to reduce the difference between the sensed temperature and the temperature set point. In some embodiments determining the difference between the sensed temperature and the temperature set point comprises determining, by a proportional-integral-derivative (PID) module of the controller, the difference between the sensed temperature and the temperature set point.

According to another aspect of the present disclosure, a fuel cell system comprises a fuel cell stack, and oxidant flow control device, a fuel flow control device, a temperature sensor, an oxidant heater, and a controller. The fuel cell stack comprises multiple fuel cells each comprising an anode and a cathode. The oxidant flow control device is in fluid communication with the cathodes and configured to provide an oxidant at an oxidant mass flow rate to the cathodes. The fuel flow control device is in fluid communication with the anodes and configured to provide a fuel at a fuel mass flow rate to the anodes. The temperature sensor is configured to sense a temperature of the oxidant upstream of the fuel cell stack. The oxidant heater is configured to heat the oxidant upstream of the fuel cell stack. The controller is configured to control the oxidant flow control device to provide the oxidant to the cathodes; control the fuel flow control device to provide the fuel to the anodes; control the fuel cell stack to provide an electrical current to an electrical load based on a current set point; control the oxidant heater to heat the oxidant upstream of the fuel cell stack based on the current set point; control the oxidant mass flow rate based on the sensed temperature; and determine the fuel mass flow rate based on the current set point.

In some embodiments the fuel cell system further comprises an auxiliary fuel flow control device in fluid communication with the oxidant heater and configured to provide an auxiliary fuel at an auxiliary fuel mass flow rate to the oxidant heater. In some embodiments the oxidant heater is configured to heat the oxidant upstream of the fuel cell stack using the auxiliary fuel received from the auxiliary fuel flow control device. In some embodiments the controller is further configured to control the oxidant heater to heat the oxidant based on the current set point by determining the auxiliary fuel mass flow rate based on the current set point. In some embodiments a first current set point corresponds to a first fuel mass flow rate and a first auxiliary fuel mass flow rate and a second current set point that is greater than the first current set point corresponds to a second fuel mass flow rate that is greater than the first fuel mass flow rate and a second auxiliary fuel mass flow rate that is less than the first auxiliary fuel mass flow rate.

In some embodiments the controller is further configured to determine a difference between the sensed temperature and a temperature set point. In some embodiments the controller is further configured to control the oxidant mass flow rate to reduce the difference between the sensed temperature and the temperature set point. In some embodiments a proportional-integral-derivative (PID) module of the controller is configured to determine the difference between the sensed temperature and the temperature set point.

DETAILED DESCRIPTION

Figure 1:
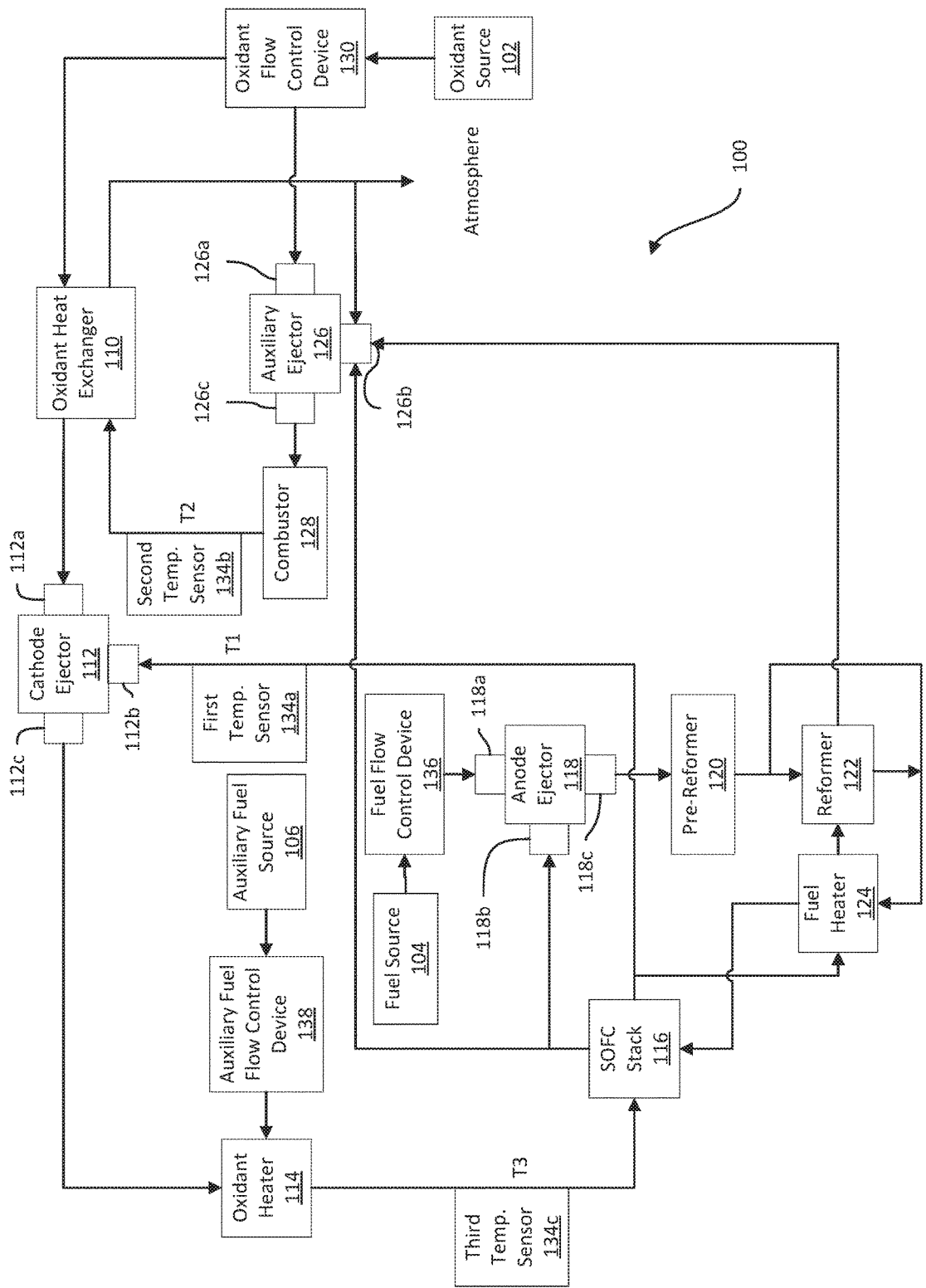
FIG. 1 is a block diagram of some components of one example embodiment of the fuel cell system of the present disclosure.

While the features, methods, devices, and systems described herein may be embodied in various forms, the drawings show and the detailed description describes some exemplary and non-limiting embodiments. Not all of the components shown and described in the drawings and the detailed descriptions may be required, and some implementations may include additional, different, or fewer components from those expressly shown and described. Variations in the arrangement and type of the components; the shapes, sizes, and materials of the components; and the manners of attachment and connections of the components may be made without departing from the spirit or scope of the claims as set forth herein. This specification is intended to be taken as a whole and interpreted in accordance with the principles of the invention as taught herein and understood by one of ordinary skill in the art.

Various embodiments of the present disclosure provide a fuel cell system configured to modulate the flow of oxidant through the fuel cell system to maintain a desired temperature at the fuel cell stack. The fuel cell system is configured to control the flow of oxidant to maintain the desired temperature in the fuel cell stack based on temperature measurements of fluid outside of the fuel cell stack.

FIGS. 1-5 illustrate one example embodiment of a solid oxide fuel cell (SOFC) system 100 of the present disclosure and components thereof. While a SOFC system is used in this example, the present disclosure may be implemented in any other suitable fuel cell system. The SOFC system 100 includes an oxidant heat exchanger 110, a cathode ejector 112, an oxidant heater 114, an SOFC stack 116, an anode ejector 118, a pre-reformer 120, a reformer 122, a fuel heat exchanger 124, an auxiliary ejector 126, a combustor 128, an oxidant flow control device 130, a controller 132, a first temperature sensor 134a, a second temperature sensor 134b, a third temperature sensor 134c, a fuel flow control device 136, and an auxiliary fuel flow control device 138.

As described in detail below, the SOFC system 100 is fluidly connectable to an oxidant source 102 (such as a source of air), a fuel source 104 (such as a source of natural gas, liquefied petroleum gas, or biogas), and an auxiliary fuel source 106 (such as a source of natural gas, hydrogen, or syngas). The SOFC system 100 is operable to use oxidant from the oxidant source 102 to oxidize fuel from the fuel source 104 to generate electricity that the SOFC stack 116 supplies to an external electrical load. The SOFC system 100 is operable to use auxiliary fuel from the auxiliary fuel source 106 to heat the oxidant flowing into the SOFC stack 116.

1. Components

The oxidant heat exchanger 110 is a suitable heat exchanger including: (1) a cold side having an oxidant inlet and an oxidant outlet (not labeled) in fluid communication with one another; and (2) a hot side having a combustion byproduct inlet and a combustion byproduct outlet (not labeled) in fluid communication with one another. The oxidant heat exchanger 110 is configured to transfer heat from relatively hot combustion byproducts that flow through the hot side from the combustion byproduct inlet to the combustion byproduct outlet to relatively cold oxidant traveling through the cold side from the oxidant inlet to the oxidant outlet. The oxidant heat exchanger 110 is a counter-flow heat exchanger in this example embodiment, though the oxidant heat exchanger 110 may be any other suitable type of heat exchanger in other embodiments.

The cathode ejector 112 includes a motive fluid inlet 112a, a suction fluid inlet 112b, and a fluid outlet 112c in fluid communication with one another. The cathode ejector 112 is configured (such as via a convergent/divergent nozzle construction or any other suitable construction) such that when a relatively high-pressure motive fluid is introduced into the motive fluid inlet 112a and a relatively low-pressure suction fluid is present at the suction fluid inlet 112b, the flow of the motive fluid through the cathode ejector 112 creates a low pressure region (a vacuum in certain instances) downstream of the motive and suction fluid inlets 112a and 112b. This low pressure region sucks the suction fluid from the suction fluid inlet 112b and causes the suction fluid to mix with the motive fluid before flowing out of the fluid outlet 112c.

The oxidant heater 114 includes an oxidant inlet and an oxidant outlet (not labeled) in fluid communication with one another. The oxidant heater 114 also includes an auxiliary fuel inlet (not labeled). The oxidant heater 114 is configured to convert auxiliary fuel (received from the auxiliary fuel flow control device 138) into heat and to use that heat to heat the oxidant in thermal communication with the oxidant heater 114. In this example, the oxidant heater 114 includes a gas burner, though it may be any other suitable device in other embodiments such as a catalytic start burner or electric heater.

The SOFC stack 116 includes multiple individual SOFCs (not shown) each including an anode and a cathode sandwiching an electrolyte. The SOFCs are electrically connected to one another in series via interconnects. The SOFC stack 116 includes a fuel inlet and a fuel outlet (not labeled) in fluid communication with one another and an oxidant inlet and an oxidant outlet (not labeled) in fluid communication with one another. The SOFC stack 116 is also electrically connectable to the electrical load. Generally, in operation, as oxidant flows past the cathodes and fuel flows past the anodes of the SOFCs of the SOFC stack 116, the oxygen in the oxidant is reduced into oxygen ions at the cathodes that then diffuse through the electrolytes to the anodes. The fuel is oxidized at the anodes, which produces electrons that flow through the electrical load.

The anode ejector 118 includes a motive fluid inlet 118a, a suction fluid inlet 118b, and a fluid outlet 118c in fluid communication with one another. The anode ejector 118 is configured (such as via a convergent/divergent nozzle construction or any other suitable construction) such that when a relatively high-pressure motive fluid is introduced into the motive fluid inlet 118a and a relatively low-pressure suction fluid is present at the suction fluid inlet 118b, the flow of the motive fluid through the anode ejector 118 creates a low pressure region (a vacuum in certain instances) downstream of the motive and suction fluid inlets 118a and 118b. This low pressure region sucks the suction fluid from the suction fluid inlet 118b and causes the suction fluid to mix with the motive fluid before flowing out of the fluid outlet 118c.

The pre-reformer 120 includes a fuel inlet and a fuel outlet (not labeled) in fluid communication with one another. The pre-reformer 120 is a suitable device (such as an adiabatic catalytic converter) configured to remove higher hydrocarbons from unreformed fuel to convert it into pre-reformed fuel. In certain embodiments, the pre-reformer is configured to do so with no heat input other than the heat present in the fuel and/or the exhausted oxidant. In other embodiments, the SOFC system does not include a pre-reformer.

The reformer 122 includes: (1) a cold side including a fuel inlet and a fuel outlet (not labeled) in fluid communication with one another; and (2) a hot side including an oxidant inlet and an oxidant outlet (not labeled) in fluid communication with one another. The reformer 122 is configured to transfer heat from relatively hot oxidant that flows through the hot side from the oxidant inlet to the oxidant outlet to relatively cold pre-reformed fuel traveling through the cold side from the fuel inlet to the fuel outlet. The reformer 122 is (partially) a counter-flow heat exchanger in this example embodiment, though the reformer may incorporate any other suitable type of heat exchanger in other embodiments. As the pre-reformed fuel flows from the fuel inlet to the fuel outlet, the reformer 122 is configured to reform the pre-reformed fuel via a catalyst into reformed fuel. The heating of the pre-reformed fuel aids in the catalytic conversion process.

The fuel heat exchanger 124 includes: (1) a cold side having a fuel inlet and a fuel outlet (not labeled) in fluid communication with one another; and (2) a hot side having an oxidant inlet and an oxidant outlet (not labeled) in fluid communication with one another. The fuel heat exchanger 124 is configured to transfer heat from relatively hot oxidant traveling through the hot side from the oxidant inlet to the oxidant outlet to relatively cold reformed fuel traveling through the cold side from the fuel inlet to the fuel outlet. The fuel heat exchanger 124 is a counter-flow heat exchanger in this example embodiment, though the fuel heat exchanger may be any other suitable type of heat exchanger in other embodiments.

The auxiliary ejector 126 includes a motive fluid inlet 126a, a suction fluid inlet 126b, and a fluid outlet 126c in fluid communication with one another. The auxiliary ejector 126 is configured (such as via a convergent/divergent nozzle construction or any other suitable construction) such that when a relatively high-pressure motive fluid is introduced into the motive fluid inlet 126a and a relatively low-pressure suction fluid is present at the suction fluid inlet 126b, the flow of the motive fluid through the auxiliary ejector 126 creates a low pressure region (a vacuum in certain instances) downstream of the motive and suction fluid inlets 126a and 126b. This low pressure region sucks the suction fluid from the suction fluid inlet 126b and causes the suction fluid to mix with the motive fluid before flowing out of the fluid outlet 126c.

The combustor 128 includes a combustion product inlet and a combustion byproduct outlet (not labeled) in fluid communication with one another. The combustor 128 is a suitable device (such as a catalytic start gas combustor) configured to receive (via the auxiliary ejector 126, described below) and combust some or all of: (1) the fuel exhausted from the SOFC stack 116; (2) the oxidant exhausted from SOFC stack 116; and (3) fresh oxidant received from the oxidant supply 102. While the combustor 128 and the auxiliary ejector 126 are shown as separate components in this example embodiment, in other embodiments the combustor and the auxiliary ejector are combined into a single component.

The oxidant flow control device 130 includes an oxidant inlet and an oxidant outlet (not labeled) in fluid communication with one another. The oxidant inlet is fluidly connectable to the oxidant supply 102 to enable the oxidant flow control device 130 to draw oxidant from the oxidant supply 102. The oxidant flow control device 130 is any suitable device configured to (directly or indirectly) control the mass flow rate of the oxidant into the SOFC system 100. The oxidant flow control device 130 may include, for instance, turbo-generators, turbochargers, an air compressor, a metering valve, or any other suitable system or component(s).

Figure 2:
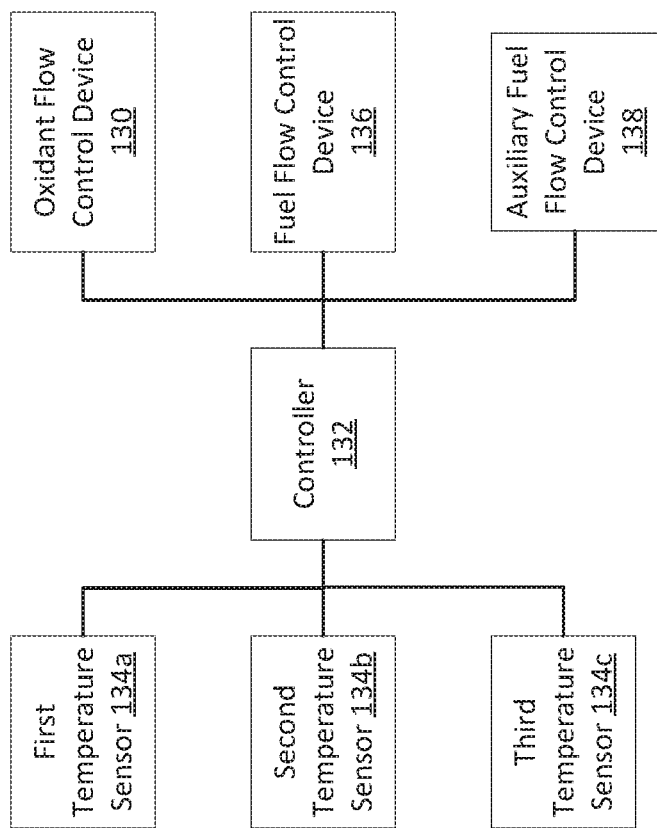
FIG. 2 is another block diagram of some components of the fuel cell system of FIG. 1.

As shown in FIG. 2, the controller 132 includes a central processing unit (CPU) (not shown) communicatively connected to a memory (not shown). The CPU is configured to execute program code or instructions stored on the memory to control operation of various components of the SOFC system 100. The CPU may be a microprocessor; a content-addressable memory; a digital-signal processor; an application-specific integrated circuit; a field-programmable gate array; any suitable programmable logic device, discrete gate, or transistor logic; discrete hardware components; or any combination of these. The CPU may also be implemented as a combination of these devices, such as a combination of a digital signal processor and a microprocessor, a plurality of microprocessors, or one or more microprocessors in conjunction with a digital signal processor core.

The memory is configured to store, maintain, and provide data as needed to support the functionality of the SOFC system 100. For instance, in various embodiments, the memory stores program code or instructions executable by the CPU to control operation of the SOFC system 100. The memory includes any suitable data storage device or devices, such as volatile memory (e.g., random-access memory, dynamic random-access memory, or static random-access memory); non-volatile memory (e.g., read-only memory, mask read-only memory, programmable read-only memory, erasable programmable read-only memory, electrically erasable programmable read-only memory); and/or non-volatile random-access memory (e.g., flash memory, solid-state storage).

Figure 4:
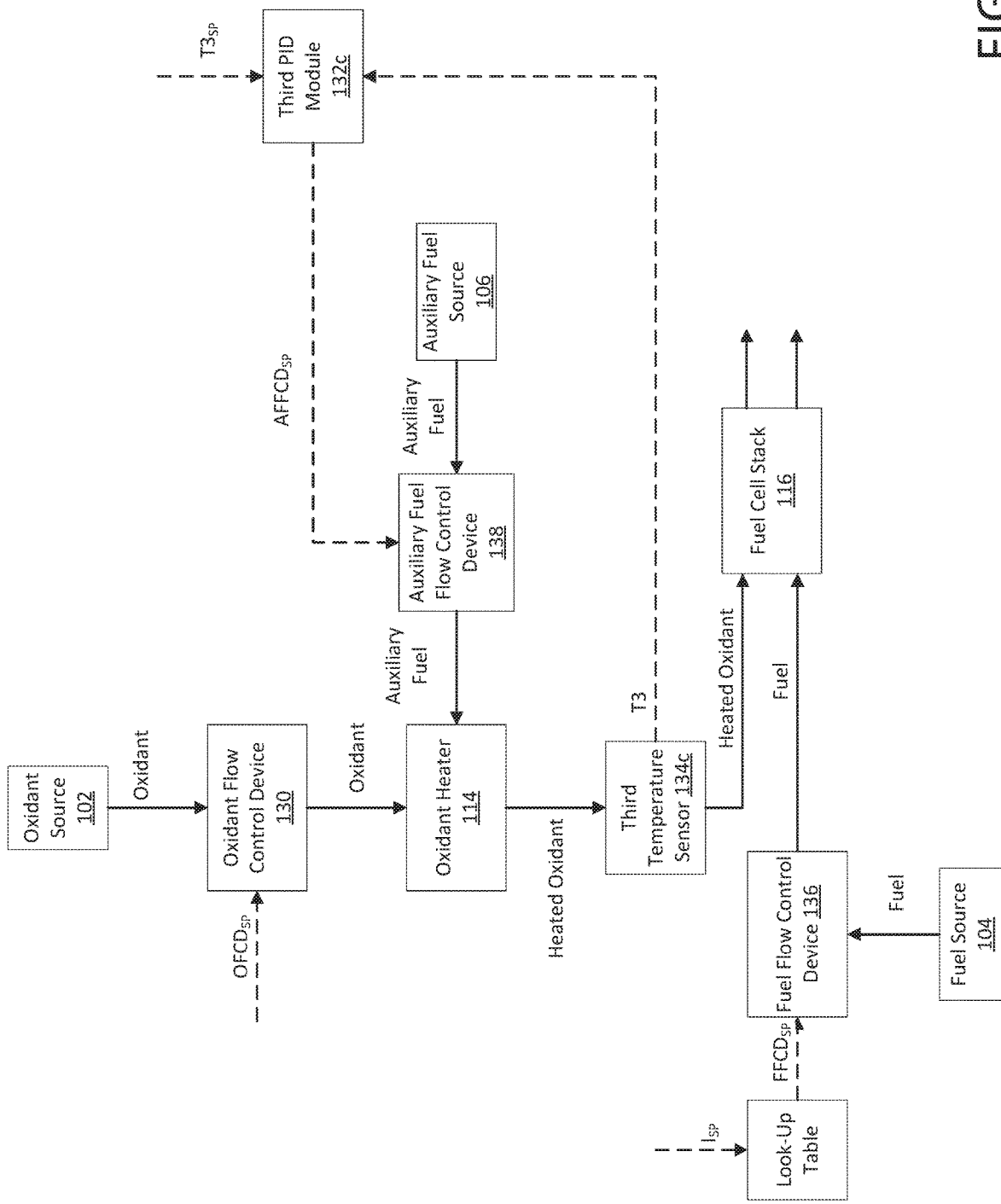
FIG. 4 is another block diagram of some components of the fuel cell system of FIG. 1 during a transition from standby mode to operating mode. Dashed lines represent control signals while solid lines represent fluid flow paths.
Figure 5:
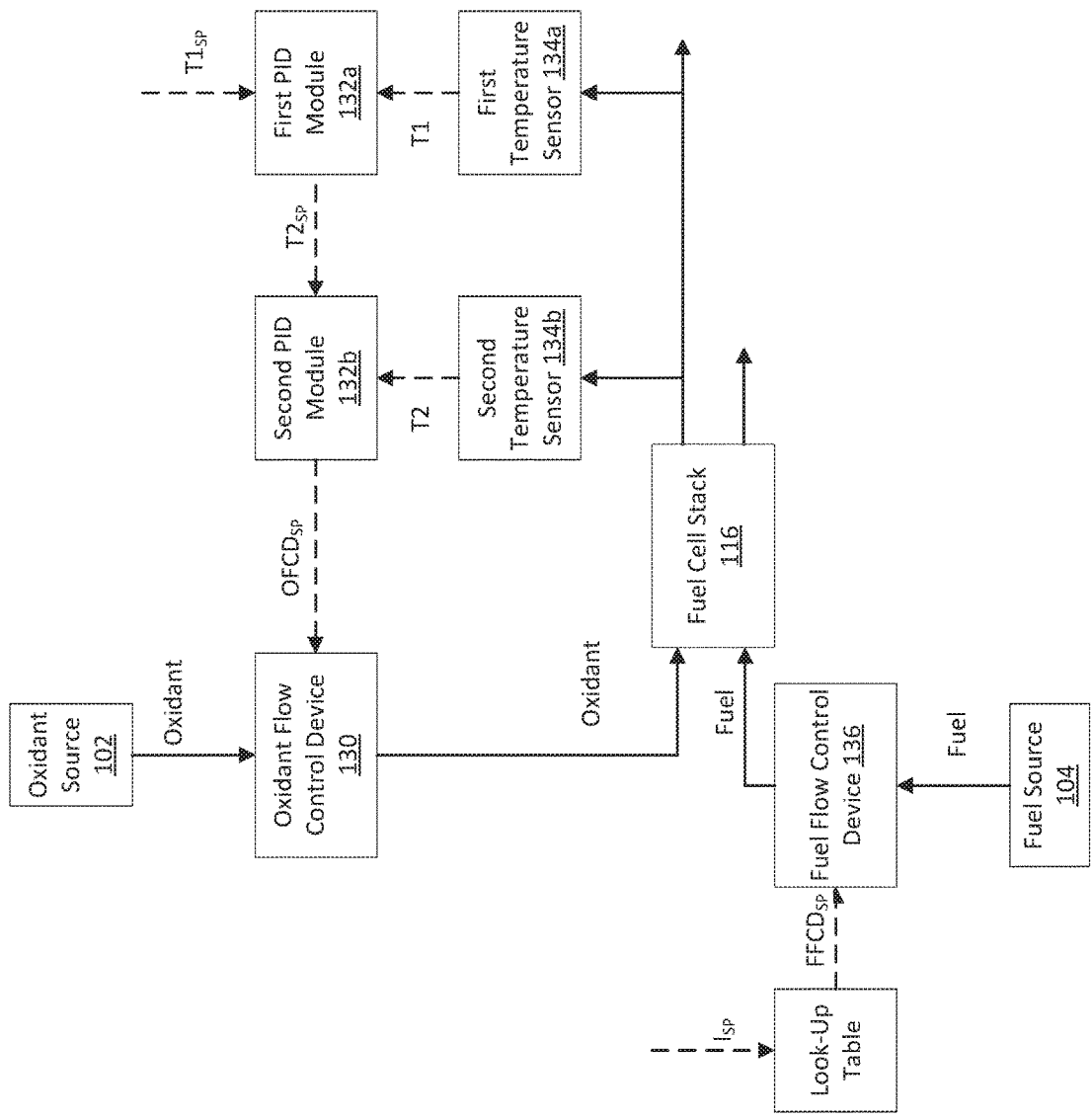
FIG. 5 is another block diagram of some components of the fuel cell system of FIG. 1 during operating mode. Dashed lines represent control signals while solid lines represent fluid flow paths.
Figure 6:
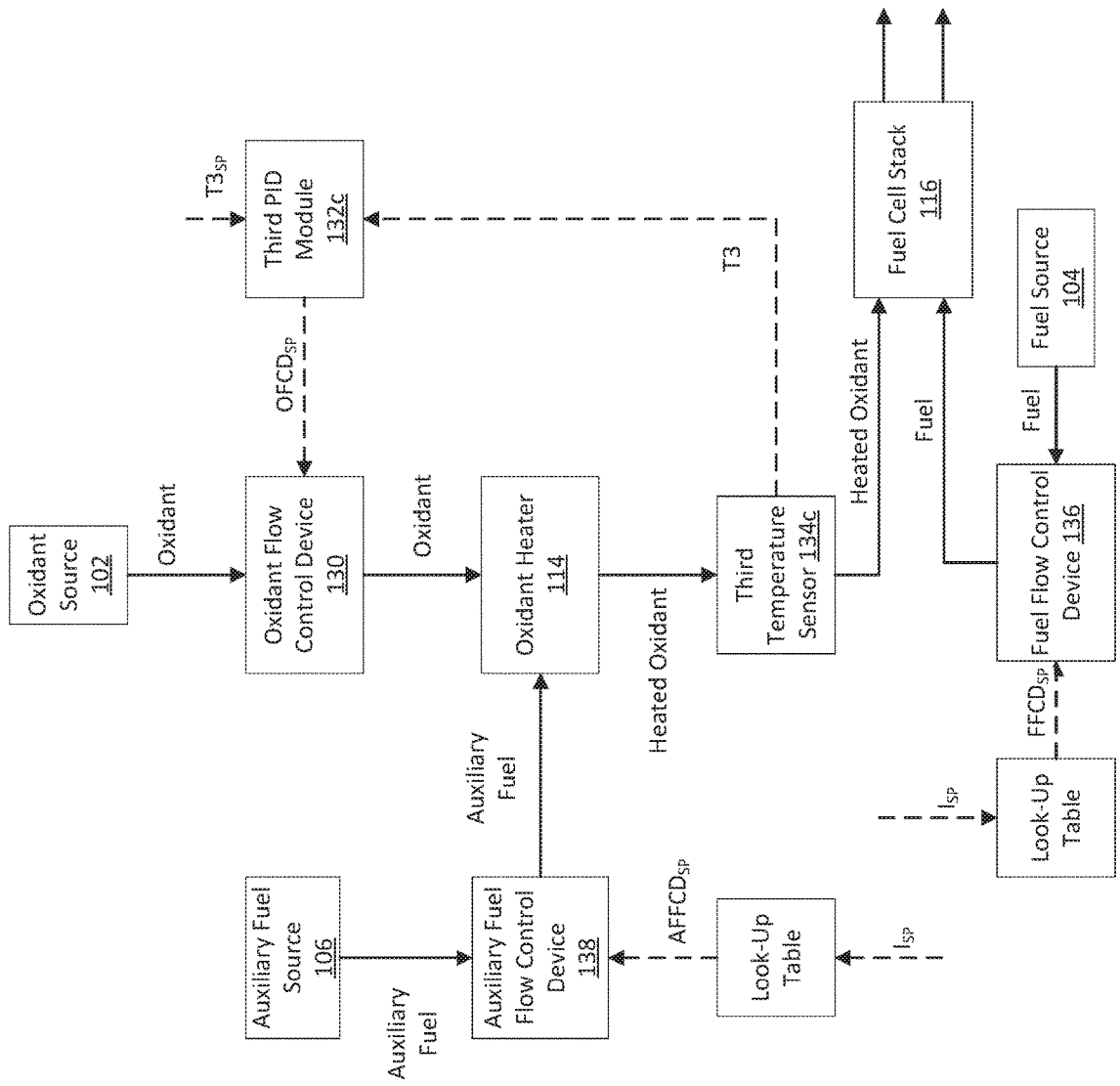
FIG. 6 is another block diagram of some components of the fuel cell system of FIG. 1 during an alternative transition from standby mode to operating mode. Dashed lines represent control signals while solid lines represent fluid flow paths.

As shown in FIGS. 4-6, the controller 132 also includes first, second, and third proportional-integral-derivative (PID) modules 132a, 132b, and 132c.

The temperature sensors 134a, 134b, and 134c are thermocouples or any other suitable sensors configured to sense the temperature of the fluid or the components at locations T1, T2, and T3, respectively, in the SOFC system 100 (described below) and to generate and send signals that correspond to the sensed temperature to the controller 132.

The fuel flow control device 136 includes a fuel inlet and a fuel outlet (not labeled) in fluid communication with one another. The fuel inlet is fluidly connectable to the fuel source 104 to enable the fuel flow control device 136 to draw fuel from the fuel source 104. The fuel flow control device 136 is any suitable device configured to (directly or indirectly) control the mass flow rate of the fuel into the SOFC system 100. The fuel flow control device 136 may include, for instance, a pump, a gas compressor, a metering valve, or any other suitable system or component(s).

The auxiliary fuel flow control device 138 includes an auxiliary fuel inlet and an auxiliary fuel outlet (not labeled) in fluid communication with one another. The auxiliary fuel inlet is fluidly connectable to the auxiliary fuel source 106 to enable the auxiliary fuel flow control device 138 to draw auxiliary fuel from the auxiliary fuel source 106. The auxiliary fuel flow control device 138 is any suitable device configured to (directly or indirectly) control the mass flow rate of the auxiliary fuel into the oxidant heater 114. The auxiliary fuel flow control device 138 may include, for instance, a pump, a gas compressor, a metering valve, or any other suitable system or component(s).

2. Connections

The oxidant inlet of the oxidant flow control device 130 is fluidly connectable to the oxidant source 102. The oxidant outlet of the oxidant flow control device 130 is in fluid communication with the oxidant inlet of the cold side of the oxidant heat exchanger 110 and with the motive fluid inlet 126a of the auxiliary ejector 126.

The oxidant inlet of the cold side of the oxidant heat exchanger 110 is in fluid communication with the oxidant outlet of the oxidant flow control device 130. The oxidant outlet of the cold side of the oxidant heat exchanger 110 is in fluid communication with the motive fluid inlet 112a of the cathode ejector 112. The combustion byproduct inlet of the hot side of the oxidant heat exchanger 110 is in fluid communication with the combustion byproduct outlet of the combustor 128. The combustion byproduct outlet of the hot side of the oxidant heat exchanger 110 is in fluid communication with the suction fluid inlet 126b of the auxiliary ejector 126 and may be vented to the atmosphere after passing through the turbine of a turbo-generator (not shown) and a recuperator (not shown).

The motive fluid inlet 112a of the cathode ejector 112 is in fluid communication with the oxidant outlet of the cold side of the oxidant heat exchanger 110. The suction fluid inlet 112b of the cathode ejector 112 is in fluid communication with the oxidant outlet of the SOFC stack 116. The fluid outlet 112c of the cathode ejector 112 is in fluid communication with the oxidant inlet of the oxidant heater 114.

The auxiliary fuel inlet of the auxiliary fuel flow control device 138 is fluidly connectable to the auxiliary fuel source 106. The auxiliary fuel outlet of the auxiliary fuel flow control device 138 is in fluid communication with the auxiliary fuel inlet of the oxidant heater 114.

The oxidant inlet of the oxidant heater 114 is in fluid communication with the fluid outlet 112c of the cathode ejector 112. The oxidant outlet of the oxidant heater 114 is fluid communication with the oxidant inlet of the SOFC stack 116. The auxiliary fuel inlet of the oxidant heater 114 is in fluid communication with the auxiliary fuel outlet of the auxiliary fuel flow control device 138.

The oxidant inlet of the SOFC stack 116 is in fluid communication with the oxidant outlet of the oxidant heater 114. The oxidant outlet of the SOFC stack 116 is in fluid communication with the suction fluid inlet 112b of the cathode ejector 112. The fuel inlet of the SOFC stack 116 is in fluid communication with the fuel outlet of the fuel heat exchanger 124. The fuel outlet of the SOFC stack 116 is in fluid communication with the suction fluid inlets 118b and 126b of the anode ejector 118 and the auxiliary ejector 126, respectively.

The fuel inlet of the fuel flow control device 136 is fluidly connectable to the fuel source 104. The fuel outlet of the fuel flow control device 136 is in fluid communication with the motive fluid inlet 118a of the anode ejector 118.

The motive fluid inlet 118a of the anode ejector 118 is in fluid communication with the fuel outlet of the fuel flow control device 136. The suction fluid inlet 118b of the anode ejector 118 is in fluid communication with the fuel outlet of the SOFC stack 116. The fluid outlet 118c of the anode ejector 118 is in fluid communication with the fuel inlet of the pre-reformer 120.

The fuel inlet of the pre-reformer 120 is in fluid communication with the fluid outlet 118c of the anode ejector 118. The fuel outlet of the pre-reformer 120 is in fluid communication with the fuel inlet of the reformer 122 and with the fuel inlet of the fuel heat exchanger 124.

The fuel inlet of the reformer 122 is in fluid communication with the fuel outlet of the pre-reformer 120. The fuel outlet of the reformer 122 is in fluid communication with the fuel inlet of the fuel heat exchanger 124. The oxidant inlet of the reformer 122 is in fluid communication with the oxidant outlet of the fuel heat exchanger 124. The oxidant outlet of the reformer 122 is in fluid communication with the suction fluid inlet 126b of the auxiliary reformer 126.

The fuel inlet of the fuel heat exchanger 124 is in fluid communication with the fuel outlet of the pre-reformer 120 and the fuel outlet of the reformer 122. The fuel outlet of the fuel heat exchanger 124 is in fluid communication with the fuel inlet of the SOFC stack 116. The oxidant inlet of the fuel heat exchanger 124 is in fluid communication with the oxidant outlet of the SOFC stack 116. The oxidant outlet of the fuel heat exchanger 124 is in fluid communication with the oxidant inlet of the reformer 122.

The motive fluid inlet 126a of the auxiliary ejector 126 is in fluid communication with the oxidant outlet of the oxidant flow control device 130. The suction fluid inlet 126b of the auxiliary ejector 126 is in fluid communication with: (1) the fuel outlet of the SOFC stack 116; (2) the oxidant outlet of the reformer 122; and (3) the combustion byproduct outlet of the hot side of the oxidant heat exchanger 110. The fluid outlet 126c of the auxiliary ejector 126 is in fluid communication with the combustion product inlet of the combustor 128.

The combustion product inlet of the combustor 128 is in fluid communication with the fluid outlet 126c of the auxiliary ejector 126. The combustion byproduct outlet of the combustor 128 is in fluid communication with the combustion byproduct inlet of the hot side of the oxidant heat exchanger 110.

The first temperature sensor 134a is positioned upstream of the suction fluid inlet 112b of the cathode ejector 112 and downstream of the oxidant outlet of the SOFC stack 116 such that the first temperature sensor 134a can sense the temperature T1 of fluid (here, oxidant) at that location. The second temperature sensor 134b is positioned downstream of the combustion byproduct outlet of the combustor 128 and upstream of the combustion byproduct inlet of the hot side of the oxidant heat exchanger 110 such that the second temperature sensor 134b can sense the temperature T2 of fluid (here, combustion byproducts) at that location. The third temperature sensor 134c is positioned upstream of the oxidant inlet of the SOFC stack 116 and downstream of the oxidant outlet of the oxidant heater 114 such that the third temperature sensor 134c can sense the temperature T3 of fluid (here, oxidant) at that location.

As shown in FIG. 2, the controller 132 is communicatively connected to the first, second, and third temperature sensors 134a, 134b, and 134c to receive the signals from the temperature sensors that correspond to the sensed temperatures.

The controller 132 is operatively connected to the oxidant flow control device 130 to control the oxidant flow control device 130 by providing the oxidant flow control device 130 an oxidant flow control device set point $OFCD_{SP}$. The $OFCD_{SP}$ corresponds to a particular output of the oxidant flow control device 130 (such as a particular quantity of revolutions per minute if the oxidant flow control device is a turbine) that itself corresponds to a particular mass flow rate of oxidant into the SOFC system 100. The controller 132 is therefore configured to control the mass flow rate of oxidant into the SOFC system 100 via the $OFCD_{SP}$ the controller 132 provides to the oxidant flow control device 130.

The controller 132 is operatively connected to the fuel flow control device 136 to (in certain operating modes) control the fuel flow control device 136 by providing the fuel flow control device 136 a fuel flow control device set point $FFCD_{SP}$. The $FFCD_{SP}$ corresponds to a particular output of the fuel flow control device 136 (such as a particular quantity of liters per minute if the fuel flow control device is a pump) that itself corresponds to a particular mass flow rate of fuel into the SOFC system 100. The controller 132 is therefore configured to control the mass flow rate of fuel into the SOFC system 100 via the $FFCD_{SP}$ the controller 132 provides to the fuel flow control device 136.

The controller 132 is operatively connected to the auxiliary fuel flow control device 138 to (in certain operating modes) control the auxiliary fuel flow control device 138 by providing the auxiliary fuel flow control device an auxiliary fuel flow control device set point $AFFCD_{SP}$. The $AFFCD_{SP}$ corresponds to a particular output of the auxiliary fuel flow control device 138 (such as a particular quantity of liters per minute if the auxiliary fuel flow control device is a pump) that itself corresponds to an amount of heat the oxidant heater 114 provides to the oxidant. The controller 132 is therefore configured to control the amount of heat the oxidant heater 114 provides to the oxidant via the $AFFCD_{SP}$ the controller 132 provides to the auxiliary fuel flow control device.

3. Operation

The SOFC system 100 is operable in an operating mode and a standby mode. Shut-down mode as used herein refers to a state in which the SOFC system 100 is not operating and is at ambient temperature.

When the SOFC system 100 is in operating mode, the SOFC stack 116 is at an operating temperature within a range of operating temperatures, such as between about 800 degrees centigrade and 1000 degrees centigrade, and the SOFC system 100 provides the oxidant to the cathode side of the SOFC stack 118 and fuel to the anode side of the SOFC stack 118. The ensuing reactions generate electricity that is provided to the electrical load 300.

When the SOFC system 100 is in standby mode, the SOFC stack 116 is at a standby temperature that may be within the range of operating temperatures (or below the range of operating temperatures), and the SOFC system 100 provides the oxidant to the cathode side of the SOFC stack 116 but does not provide fuel to the anode side of the SOFC stack 116. This means that the SOFC stack 116 does not provide electrical power to the electrical load 300 in standby mode. To ensure the SOFC stack 116 remains at the operating temperature when in standby mode, the SOFC system 100 supplies auxiliary fuel to the oxidant heater 114 to heat the oxidant flowing into the SOFC stack 116.

Generally, when oxidant flows through the SOFC system 100, it does so as follows. The controller 132 is configured to control the oxidant flow control device 130 to draw oxidant from the oxidant source 102 and deliver the oxidant to the oxidant inlet of the cold side of the oxidant heat exchanger 110. As the oxidant flows from the oxidant inlet to the oxidant outlet, relatively hot combustion byproducts (or oxidant, depending on the mode of operation) traveling through the hot side of the oxidant heat exchanger 110 (described below) heat the oxidant. The oxidant exits the oxidant outlet of the cold side of the oxidant heat exchanger 110 and flows into the motive fuel inlet 112a of the cathode ejector 112.

The oxidant flows through the cathode ejector 112, mixes with oxidant received at the suction fluid inlet 112b, and flows out of the fluid outlet 112c to the oxidant inlet of the oxidant heater 114. If the auxiliary fuel flow control device 138 is providing auxiliary fuel to the oxidant heater 114, the oxidant heater 114 heats the oxidant as the oxidant flows from the oxidant inlet of the oxidant heater 114 to the oxidant outlet of the oxidant heater 114.

The oxidant flows past the third temperature sensor 134c to the oxidant inlet of the SOFC stack 116. The oxidant flows from the oxidant inlet of the SOFC stack 116 to the oxidant outlet of the SOFC stack 116. The oxidant flows from the oxidant outlet of the SOFC stack 116: (1) past the first temperature sensor 134a and to the suction fluid inlet 112b of the cathode ejector 112; or (2) to the oxidant inlet of the fuel heat exchanger 124. As described above, the oxidant that flows to the suction fluid inlet 112b of the cathode ejector 112 mixes with oxidant received at the motive fluid inlet 112a and flows back to the oxidant heater 114.

The oxidant that flows to the oxidant inlet of the fuel heat exchanger 124 flows through the fuel heat exchanger 124, exits the oxidant outlet of the fuel heat exchanger 124, and flows to the oxidant inlet of the reformer 122. The oxidant flows through the reformer 122, exits the oxidant outlet of the reformer 122, and flows to the suction fluid inlet 126b of the auxiliary ejector 126.

If fuel is not also flowing through the SOFC system 100, the oxidant mixes with oxidant received from the oxidant heat exchanger 110 and is sucked through the auxiliary ejector 126 by oxidant received from the oxidant flow control device 130 at the motive fluid inlet 126*a*. The oxidant flows out of the fluid outlet 126*c* to the combustion products inlet of the combustor 128. Since no fuel is present in the oxidant, the oxidant flows through the combustor 128 without being ignited and past the second temperature sensor 134*b* and to the combustion byproducts inlet of the hot side of the oxidant heat exchanger 110. As this relatively hot oxidant flows through the oxidant heat exchanger 110, it heats the fresh oxidant flowing from the oxidant flow control device 130 to the cathode ejector 112, as described above. After exiting the combustion byproducts outlet of the hot side of the oxidant heat exchanger 110, some of the oxidant flows back to the suction fluid inlet 126*b* of the auxiliary ejector 126 and some of the oxidant is exhausted to atmosphere.

If fuel is also flowing through the SOFC system 100, the oxidant at the suction fluid inlet 126*b* of the auxiliary ejector 126 mixes with combustion byproducts received from the oxidant heat exchanger 110*b* and is sucked through the auxiliary ejector 126 by oxidant received from the oxidant flow control device 130 at the motive fluid inlet 126*a*. The oxidant/combustion byproducts mixture—referred to as combustion products—flows out of the fluid outlet 126*c* to the combustion products inlet of the combustor 128. The combustor 128 ignites the combustion products to produce heated combustion byproducts, which flow from the combustion byproducts outlet of the combustor 128 past the second temperature sensor 134*b* and to the combustion byproducts inlet of the hot side 110*b* of the oxidant heat exchanger 110. As these relatively hot combustion byproducts flow through the oxidant heat exchanger 110, they heat the fresh oxidant flowing from the oxidant flow control device 130 to the cathode ejector 112, as described above. After exiting the combustion byproducts outlet of the hot side 110*b* of the oxidant heat exchanger 110, some of the combustion byproducts flow back to the suction fluid inlet 126*b* of the auxiliary ejector 126 and some of the combustion byproducts are exhausted to atmosphere.

Generally, when fuel flows through the SOFC system 100, it does so as follows. The fuel flow control device 136 is configured to draw unreformed fuel from the fuel source 104 and deliver the unreformed fuel to the motive fluid inlet 118*a* of the anode ejector 118. The unreformed fuel flows through the anode ejector 118, mixes with fuel that is recycled from the fuel cell stack exhaust and received at the suction fluid inlet 118*b*, and flows out of the fluid outlet 118*c* to the fuel inlet of the pre-reformer 120.

The pre-reformer 120 removes higher hydrocarbons from the unreformed fuel to convert it into pre-reformed fuel. The reformed/pre-reformed fuel mixture flows out of the fuel outlet of the pre-reformer 120, at which point some of the mixture flows into the fuel inlet of the cold side of the reformer 122 and some of the mixture bypasses the reformer 122 and flows directly to the fuel inlet of the fuel heater 124.

As the mixture flows through the cold side of the reformer 122 from the fuel inlet to the fuel outlet, the relatively hot oxidant flowing through the hot side of the reformer 122 heats the mixture and the reformer 122 reforms the pre-reformed fuel portion of the mixture into reformed fuel via a catalyst. The reformed fuel flows from the fuel outlet of the reformer 122 and joins the pre-reformed/reformed fuel mixture that bypassed the reformer 122 before flowing to the fuel inlet of the cold side of the fuel heater 124. As the mixture flows through the cold side of the fuel heater 124, the relatively hot oxidant flowing through the hot side of the fuel heater 124 heats the mixture before it exits the fuel outlet of the fuel heater 124 and flows to the fuel inlet of the SOFC stack 116.

The pre-reformed/reformed fuel mixture flows through the SOFC stack 116 and from the fuel outlet of the SOFC stack 116 to: (1) the suction fluid inlet 118*b* of the anode ejector 118; and (2) the suction fluid inlet 126*b* of the auxiliary ejector 126. The pre-reformed/reformed fuel mixture received at the suction fluid inlet 126*b* forms part of the combustion products the combustor 128 ignites, as described above.

Described below are methods for transitioning the SOFC system 100 from shut-down mode to standby mode, for transitioning the SOFC system 100 from standby mode to operating mode, and for operating the SOFC system 100 at operating mode.

3.1 Transitioning from Shut-Down Mode to Standby Mode

Figure 3:
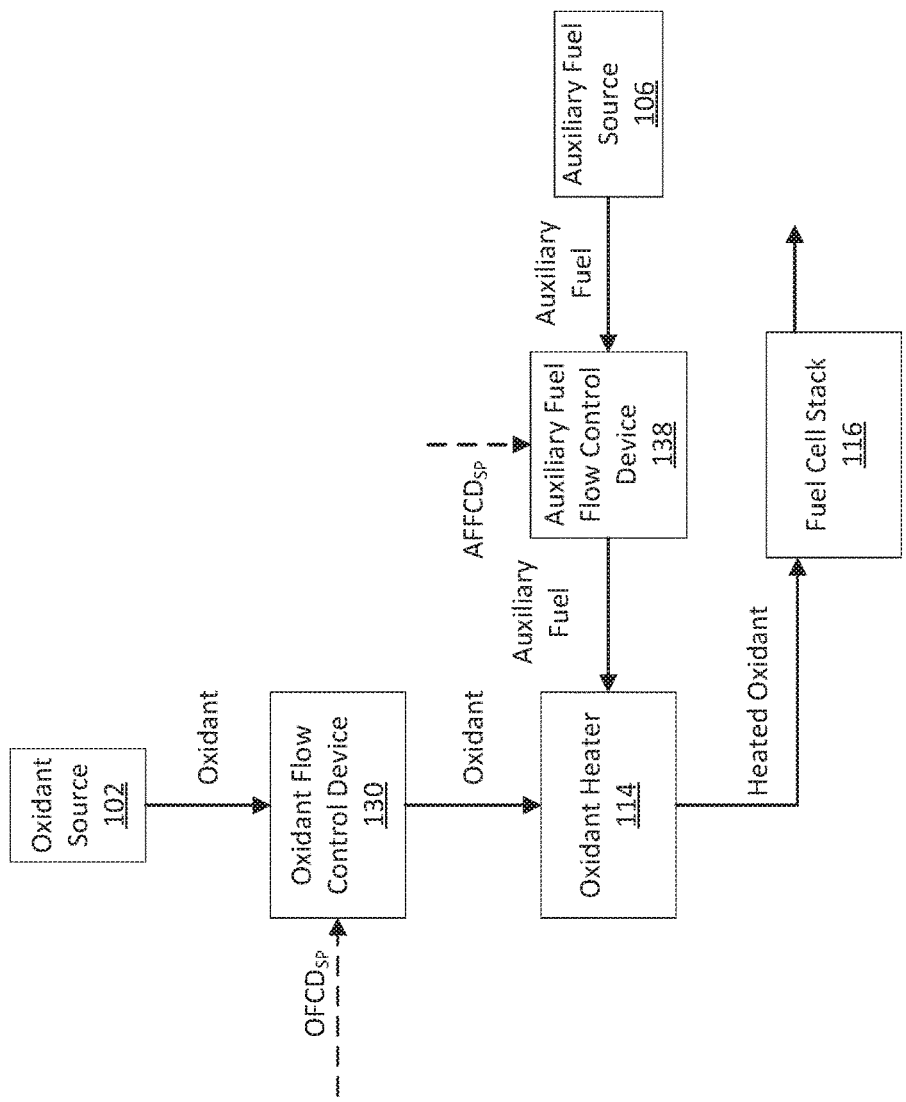
FIG. 3 is another block diagram of some components of the fuel cell system of FIG. 1 during a transition from shut-down mode to standby mode. Dashed lines represent control signals while solid lines represent fluid flow paths.

As shown in FIG. 3, upon initial startup of the SOFC system 100 from shut-down mode (and ambient temperature) to standby mode, the controller 132 is operable to raise the temperature T3 to a standby temperature at a desired rate. The controller 132 is configured to do so by: (1) controlling the oxidant flow control device 130 to control the flow of oxidant into the SOFC system 100; and (2) controlling the auxiliary fuel flow control device 138 to control the flow of auxiliary fuel to the oxidant heater 114 and thus the amount of heat applied to the oxidant. Since fuel is not flowing through the SOFC system 100 during startup, the SOFC stack 116 does not supply electricity to the electrical load.

More specifically, the controller 132 is configured to provide an oxidant flow control device set point ($OFCD_{SP}$) (which may be stored in the memory of the controller 132) to the oxidant flow control device 130 to control the oxidant flow control device 130 to provide a corresponding mass flow rate of oxidant into the SOFC system 100. The oxidant flows through the SOFC system 100 as generally described above. The controller 132 is also configured to provide an auxiliary fuel flow control device set point ($AFFCD_{SP}$) (which may be stored in the memory of the controller 132 or determined according to a predetermined function or using a PID feedback loop tied to T3) to the auxiliary fuel flow control device 138 to control the auxiliary fuel flow control device 138 to increase the mass flow rate of the auxiliary fuel to the oxidant heater 114 (and thus the amount of heat applied to the oxidant in thermal communication with the oxidant heater 114) over time to enable controlled heating of the SOFC stack 116 to the operating temperature.

Once the temperature T3 reaches the standby temperature (with no fuel flowing through the SOFC system 100), the SOFC system 100 is in standby mode, and the controller 132 is configured to control the oxidant flow control device 130 and the auxiliary fuel flow control device 138 to maintain the temperature T3 at the standby temperature (such as via a PID feedback loop tied to T3).

3.2 Transitioning from Standby Mode to Operating Mode

To transition the SOFC system 100 from standby mode to operating mode, the controller 132 is configured to ramp up the amount of fuel flowing through the SOFC system 100, ramp up the amount of electricity provided to the electrical load, and taper off the amount of auxiliary fuel supplied to the oxidant heater while achieving and maintaining a temperature T3 within the range of operating temperatures.

To do so, the controller 132 is configured to: (1) control the oxidant flow control device 130 to control the flow of oxidant into the SOFC system 100; (2) control the auxiliary fuel flow control device 138 to control the flow of auxiliary fuel to the oxidant heater 114 and thus the amount of heat applied to the oxidant; and (3) control the fuel flow control device 136 to control the flow of fuel into the SOFC system 100.

More specifically, the controller 132 is configured to provide a generally constant $OFCD_{SP}$ to provide a constant mass flow rate of oxidant into the SOFC system 100. The oxidant flows through the SOFC system 100 as generally described above.

The controller 132 is also configured to determine the $AFFCD_{SP}$ based on a PID feedback loop. In this embodiment, the controller 132 is configured to receive (via user input or via a lookup table stored on the memory of the controller 132) an SOFC stack inlet temperature set point $T3_{SP}$, which represents a desired temperature of the oxidant just upstream of the oxidant inlet of the SOFC stack 116 and downstream of the oxidant outlet of the oxidant heater 114.

The controller 132 is communicatively connected to the third temperature sensor 134c to receive a signal corresponding to the temperature T3, which represents the measured temperature of the oxidant just upstream of the oxidant inlet of the SOFC stack 116 and downstream of the oxidant outlet of the oxidant heater 114. The controller 132 is configured to calculate the arithmetic mean, the median, or another average temperature $T3_{MEAS}$ from multiple measured temperatures over a particular period of time (though in other embodiments $T3_{MEAS}$ represents an instantaneous temperature reading).

The third PID module 132c is configured to calculate the difference (if any) between $T3_{SP}$ and $T3_{MEAS}$, and controls the output of the auxiliary fuel flow control device 138 to reduce the difference between $T3_{SP}$ and $T3_{MEAS}$. The third PID module 132c is configured to do so by using the difference between $T3_{SP}$ and $T3_{MEAS}$ to determine an $AFFCD_{SP}$ that corresponds to an output of the auxiliary fuel flow control device 138 that will (via operation of the oxidant heater 114) reduce the difference between $T3_{SP}$ and $T3_{MEAS}$. In this embodiment, the controller 132 is therefore configured to modulate the output of the auxiliary fuel flow control device 138 to converge $T3_{MEAS}$ to $T3_{SP}$. The controller 132 is configured to provide the $AFFCD_{SP}$ to the auxiliary fuel flow control device 138 to control the heat provided by the oxidant heater 114. Generally, $AFFCD_{SP}$ decreases over time as the SOFC stack 116 heats up because the chemical reactions in the SOFC stack 116 generate heat.

The controller 132 is also configured to determine and provide an $FFCD_{SP}$ to the fuel flow control device 136 to control the fuel flow control device 136 (and therefore the mass flow rate of fuel into the SOFC system 100). The $FFCD_{SP}$ varies in accordance with a current set point $I_{SP}$ that corresponds to the amount of current the SOFC stack 116 is desired to supply to the electrical load. The $I_{SP}$ and the $FFCD_{SP}$ are related via a direct relationship such that the higher the $I_{SP}$, the higher the $FFCD_{SP}$. The fuel flows through the SOFC system 100 as generally described above.

Once the mass flow rate of the auxiliary fuel reaches zero, fuel is flowing through the SOFC system 100, and the SOFC unit 116 is at the operating temperature, the SOFC system 100 is in the operating mode.

In other embodiments, the controller 132 determines $T3_{SP}$ based on the $I_{SP}$. That is, in these embodiments a relationship exists between $T3_{SP}$ and the $I_{SP}$.

FIG. 6 shows an alternative embodiment of the SOFC system employing a different way of transitioning from standby mode to operating mode. In this embodiment, the controller 132 is configured to determine the $OFCD_{SP}$ based on a PID feedback loop. The third PID module 132c is configured to calculate the difference (if any) between $T3_{SP}$ and $T3_{MEAS}$, and controls the output of the oxidant flow control device 130 to reduce the difference between $T3_{SP}$ and $T3_{MEAS}$. The PID module 132c is configured to do so by using the difference between $T3_{SP}$ and $T3_{MEAS}$ to determine an $OFCD_{SP}$ that corresponds to an output of the oxidant flow control device 130 that will reduce the difference between $T3_{SP}$ and $T3_{MEAS}$. In this embodiment, the controller 132 is therefore configured to modulate the output of the oxidant flow control device 130—and therefore the mass flow rate of oxidant into the SOFC system 100—to converge $T3_{MEAS}$ to $T3_{SP}$.

In this embodiment, the controller 132 is configured to determine (such as via a look-up table) and provide an $FFCD_{SP}$ to the fuel flow control device 136 to control the fuel flow control device 136 (and therefore the mass flow rate of fuel into the SOFC system 100). The $FFCD_{SP}$ varies in accordance with the $I_{SP}$. The $I_{SP}$ and the $FFCD_{SP}$ are related via a direct relationship such that the higher the $I_{SP}$, the higher the $FFCD_{SP}$. Additionally, the controller 132 is configured to determine (such as via a look-up table) and provide an $AFFCD_{SP}$ to the oxidant heater 114 to control the oxidant heater 114. The $AFFCD_{SP}$ varies in accordance with the $I_{SP}$. The $I_{SP}$ and the $AFFCD_{SP}$ are related via a direct relationship such that the higher the $I_{SP}$, the higher the $AFFCD_{SP}$.

3.3 Operating Mode

When in the operating mode, the controller 132 is configured to maintain the temperature of the SOFC stack 116 at the operating temperature (or within a range of operating temperatures). The controller 132 is configured to do so by: (1) controlling the oxidant flow control device 130 to control the flow of oxidant into the SOFC system 100; and (2) controlling the fuel flow control device 136 to control the flow of fuel into the SOFC system 100.

The controller 132 is configured to determine (such as via a look-up table) and provide an $FFCD_{SP}$ to the fuel flow control device 136 to control the fuel flow control device 136 (and therefore the mass flow rate of fuel into the SOFC system 100). The $FFCD_{SP}$ varies in accordance with the $I_{SP}$. The $I_{SP}$ and the $FFCD_{SP}$ are related via a direct relationship such that the higher the $I_{SP}$, the higher the $FFCD_{SP}$. Regardless of the mass flow rate of the fuel, the fuel travels through the SOFC system 100 as generally described above for the transition operating mode.

The controller 132 is also configured to determine and provide an $OFCD_{SP}$ to the oxidant flow control device 130 to control the oxidant flow control device 130 (and therefore the mass flow rate of oxidant into the SOFC system 100). In the operating mode, the controller 132 is configured to determine the $OFCD_{SP}$ based on a PID feedback loop tied to T1 and T2 (described below).

With other factors held constant (as they generally are in the operating mode), the mass flow rate of the oxidant into the SOFC system 100 controls the temperature of the SOFC stack 116. So in the operating mode, the controller 132 is configured to control the temperature of the SOFC stack 116 via controlling the output of the oxidant flow control device 130. Generally, the higher the mass flow rate of the oxidant into the SOFC system 100, the more the oxidant imparts a cooling effect on the SOFC stack 116 and the lower the temperature of the SOFC stack 116. Conversely, the lower the mass flow rate of oxidant into the SOFC system 100, the less the oxidant imparts a cooling effect on the SOFC stack 116 and the higher the temperature of the SOFC stack 116. So if the temperature of the SOFC stack 116 is higher than desired, the controller 132 is configured to control the oxidant flow control device 130 to increase the mass flow rate of the oxidant into the SOFC system 100 to increase its cooling effect and lower the temperature of the SOFC stack 116. Conversely, if the temperature of the SOFC stack 116 is lower than desired, the controller 132 is configured to control the oxidant flow control device 130 to decrease the mass flow rate of the oxidant into the SOFC system 100 to decrease its cooling effect and increase the temperature of the SOFC stack 116.

In the operating mode, the controller 132 is configured to determine the $OFCD_{SP}$ based on a PID feedback loop. The first PID module 132a is configured to receive a cathode ejector temperature set point $T1_{SP}$, which represents a desired temperature of the oxidant upstream of the suction fluid inlet 112b of the cathode ejector 112 and downstream of the oxidant outlet of the SOFC stack 116. The first PID module 132a may receive $T1_{SP}$ via user input or via a lookup table stored on the memory of the controller 132. In certain embodiments the controller determines $T1_{SP}$ based on the $I_{SP}$.

The first PID module 132a is communicatively connected to the first temperature sensor 134a to receive a signal corresponding to the temperature T1, which is the measured temperature of the oxidant upstream of the suction fluid inlet 112b of the cathode ejector 112 and downstream of the oxidant outlet of the SOFC stack 116. The controller 132 is configured to calculate the arithmetic mean, the median, or another average temperature $T1_{MEAS}$ from multiple measured temperatures over a particular period of time (though in other embodiments $T1_{MEAS}$ represents an instantaneous temperature reading).

The first PID module 132a is configured to calculate the difference (if any) between $T1_{SP}$ and $T1_{MEAS}$ and to calculate $T2_{SP}$ based on that difference. $T2_{SP}$ represents a desired temperature of the combustion byproducts downstream of the combustion byproducts outlet of the combustor 128 and upstream of the combustion byproducts inlet of the hot side of the oxidant heat exchanger 110. The first PID module 132a is configured to send $T2_{SP}$ to the second PID module 132b.

The second PID module 132b is communicatively connected to the second temperature sensor 132b to receive a signal representing the temperature T2, which is the measured temperature of the combustion byproducts downstream of the combustion byproducts outlet of the combustor 128 and upstream of the combustion byproducts inlet of the hot side of the oxidant heat exchanger 110. The controller 132 is configured to calculate the arithmetic mean, the median, or another average temperature $T2_{MEAS}$ from multiple measured temperatures over a particular period of time (though in other embodiments $T2_{MEAS}$ represents an instantaneous temperature reading).

The second PID module 132b is configured to determine the difference (if any) between $T2_{SP}$ and $T2_{MEAS}$ and to calculate the $OFCD_{SP}$ based on that difference. The $OFCD_{SP}$ corresponds to a particular mass flow rate of oxidant into the SOFC system 100 required to bring $T2_{MEAS}$ to $T2_{SP}$ and $T1_{MEAS}$ to $T1_{SP}$, thereby bringing the temperature of the SOFC stack 116 to the desired temperature. The controller 132 is configured to provide the $OFCD_{SP}$ to the oxidant flow control device 130 to control the oxidant flow control device 130 to draw oxidant from the oxidant source 102. Regardless of the mass flow rate of the oxidant, the oxidant travels through the SOFC system 100 as generally described above for the startup operating mode.

The controller 132 is therefore configured to modulate the output of the oxidant flow control device 130 based on fluid temperature measurements taken outside of the SOFC stack 116 to maintain the temperature of the SOFC stack 116 at a desired temperature (or within a desired temperature range). This is more beneficial than using temperature measurements taken at the SOFC stack 116 to determine how to modulate the output of the oxidant flow control device 130 to achieve a desired temperature in the SOFC stack because it provides a quicker response time. The SOFC stack 116 is slow to respond to thermal changes as compared to the oxidant at T1 and T2.

A method is presented of operating a fuel cell system comprising a fuel cell stack comprising multiple fuel cells each comprising an anode and a cathode. The method comprises providing, by an oxidant flow control device and at an oxidant mass flow rate, an oxidant to the cathodes; providing, by a fuel flow control device and at a fuel mass flow rate, a fuel to the anodes; controlling, by a controller and based on a current set point, the fuel cell stack to provide an electrical current to an electrical load; sensing, by a temperature sensor, a temperature of the oxidant upstream of the fuel cell stack and sending, by the temperature sensor, a signal representing the sensed temperature to the controller; controlling, by the controller and based on the sensed temperature, the oxidant mass flow rate; controlling, by the controller and based on the current set point, an oxidant heater to heat the oxidant upstream of the fuel cell stack; and determining, by the controller and based on the current set point, the fuel mass flow rate.

In some embodiments the method further comprises providing, by an auxiliary fuel flow control device and at an auxiliary fuel mass flow rate, an auxiliary fuel to an oxidant heater. In some embodiments the method further comprises controlling, by the controller, the oxidant heater to heat the oxidant upstream of the fuel cell stack using the received auxiliary fuel. In some embodiments controlling the oxidant heater to heat the oxidant point includes determining, by the controller and based on the current set point, the auxiliary fuel mass flow rate. In some embodiments a first current set point corresponds to a first fuel mass flow rate and a first auxiliary fuel mass flow rate and a second current set point that is greater than the first current set point corresponds to a second fuel mass flow rate that is greater than the first fuel mass flow rate and a second auxiliary fuel mass flow rate that is less than the first auxiliary fuel mass flow rate.

In some embodiments the method further comprises controlling, by the controller, the oxidant flow control device to provide the oxidant to the cathodes and controlling, by the controller, the fuel flow control device to provide the fuel to the anodes.

In some embodiments the method further comprises determining, by the controller, a difference between the sensed temperature and a temperature set point. In some embodiments the method further comprises controlling, by the controller, the oxidant mass flow rate to reduce the difference between the sensed temperature and the temperature set point. In some embodiments determining the difference between the sensed temperature and the temperature set point comprises determining, by a proportional-integral-derivative (PID) module of the controller, the difference between the sensed temperature and the temperature set point.

According to another aspect of the present disclosure, a fuel cell system comprises a fuel cell stack, and oxidant flow control device, a fuel flow control device, a temperature sensor, an oxidant heater, and a controller. The fuel cell stack comprises multiple fuel cells each comprising an anode and a cathode. The oxidant flow control device is in fluid communication with the cathodes and configured to provide an oxidant at an oxidant mass flow rate to the cathodes. The fuel flow control device is in fluid communication with the anodes and configured to provide a fuel at a fuel mass flow rate to the anodes. The temperature sensor is configured to sense a temperature of the oxidant upstream of the fuel cell stack. The oxidant heater is configured to heat the oxidant upstream of the fuel cell stack. The controller is configured to control the oxidant flow control device to provide the oxidant to the cathodes; control the fuel flow control device to provide the fuel to the anodes; control the fuel cell stack to provide an electrical current to an electrical load based on a current set point; control the oxidant heater to heat the oxidant upstream of the fuel cell stack based on the current set point; control the oxidant mass flow rate based on the sensed temperature; and determine the fuel mass flow rate based on the current set point.

In some embodiments the fuel cell system further comprises an auxiliary fuel flow control device in fluid communication with the oxidant heater and configured to provide an auxiliary fuel at an auxiliary fuel mass flow rate to the oxidant heater. In some embodiments the oxidant heater is configured to heat the oxidant upstream of the fuel cell stack using the auxiliary fuel received from the auxiliary fuel flow control device. In some embodiments the controller is further configured to control the oxidant heater to heat the oxidant based on the current set point by determining the auxiliary fuel mass flow rate based on the current set point. In some embodiments a first current set point corresponds to a first fuel mass flow rate and a first auxiliary fuel mass flow rate and a second current set point that is greater than the first current set point corresponds to a second fuel mass flow rate that is greater than the first fuel mass flow rate and a second auxiliary fuel mass flow rate that is less than the first auxiliary fuel mass flow rate.

In some embodiments the controller is further configured to determine a difference between the sensed temperature and a temperature set point. In some embodiments the controller is further configured to control the oxidant mass flow rate to reduce the difference between the sensed temperature and the temperature set point. In some embodiments a proportional-integral-derivative (PID) module of the controller is configured to determine the difference between the sensed temperature and the temperature set point.

Various modifications to the embodiments described herein will be apparent to those skilled in the art. These modifications can be made without departing from the spirit and scope of the present disclosure and without diminishing its intended advantages. It is intended that such changes and modifications be covered by the appended claims.

What is claimed is:

1. A fuel cell system comprising:
   a fuel cell stack comprising multiple fuel cells each comprising an anode and a cathode;
   an oxidant flow control device in fluid communication with the cathodes and configured to provide an oxidant at an oxidant mass flow rate to the cathodes;
   a fuel flow control device in fluid communication with the anodes and configured to provide a fuel at a fuel mass flow rate to the anodes;
   a temperature sensor configured to sense a temperature of the oxidant upstream of the fuel cell stack;
   an oxidant heater configured to heat the oxidant upstream of the fuel cell stack;
   an auxiliary fuel flow control device in fluid communication with the oxidant heater and configured to provide an auxiliary fuel at an auxiliary fuel mass flow rate to the oxidant heater; and
   a controller configured to:
      control the oxidant flow control device to provide the oxidant to the cathodes;
      control the fuel flow control device to provide the fuel to the anodes;
      control the fuel cell stack to provide an electrical current to an electrical load based on a current set point;
      control the oxidant heater to heat the oxidant upstream of the fuel cell stack based on the current set point;
      control the oxidant mass flow rate based on the sensed temperature; and
      determine the fuel mass flow rate based on the current set point.

2. The fuel cell system of claim 1, wherein the oxidant heater is configured to heat the oxidant upstream of the fuel cell stack using the auxiliary fuel received from the auxiliary fuel flow control device.

3. The fuel cell system of claim 2, wherein the controller is further configured to control the oxidant heater to heat the oxidant based on the current set point by determining the auxiliary fuel mass flow rate based on the current set point.

4. The fuel cell system of claim 3, wherein a first current set point corresponds to a first fuel mass flow rate and a first auxiliary fuel mass flow rate and a second current set point that is greater than the first current set point corresponds to a second fuel mass flow rate that is greater than the first fuel mass flow rate and a second auxiliary fuel mass flow rate that is less than the first auxiliary fuel mass flow rate.

5. The fuel cell system of claim 1, wherein the controller is further configured to determine a difference between the sensed temperature and a temperature set point.

6. The fuel cell system of claim 5, wherein the controller is further configured to control the oxidant mass flow rate to reduce the difference between the sensed temperature and the temperature set point.

7. The fuel cell system of claim 6, wherein a proportional-integral-derivative (PID) module of the controller is configured to determine the difference between the sensed temperature and the temperature set point.

* * * * *